(12) United States Patent
Mo et al.

(10) Patent No.: US 10,027,389 B2
(45) Date of Patent: Jul. 17, 2018

(54) HYBRID PRECODING DESIGN FOR MULTIPLE INPUT MULTIPLE OUTPUT SYSTEM WITH FEW-BIT ANALOG TO DIGITAL CONVERTERS

(71) Applicant: Samsung Electronics Co., Ltd, Suwon-si (KR)

(72) Inventors: Jianhua Mo, Mountain View, CA (US); Shadi Abu-Surra, Mountain View, CA (US); Ahmed Alkhateeb, Mountain View, CA (US); Rakesh Taori, Mountain View, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 15/001,111

(22) Filed: Jan. 19, 2016

(65) Prior Publication Data

US 2017/0019157 A1    Jan. 19, 2017

Related U.S. Application Data

(60) Provisional application No. 62/191,742, filed on Jul. 13, 2015, provisional application No. 62/205,856, filed on Aug. 17, 2015.

(51) Int. Cl.
*H04L 1/02* (2006.01)
*H04B 7/0456* (2017.01)

(52) U.S. Cl.
CPC ................... *H04B 7/0456* (2013.01)

(58) Field of Classification Search
CPC .. H04B 7/0456; H04B 7/0452; H04B 7/0413; H03M 1/12

USPC ......................................... 375/259, 260, 267
See application file for complete search history.

(56) References Cited

U.S. PATENT DOCUMENTS

| 8,451,930 B2 | 5/2013 | Koike-Akino | |
| 8,760,994 B2* | 6/2014 | Wang | H04B 7/0417 370/208 |
| 2011/0280188 A1* | 11/2011 | Jeon | H04B 7/0413 370/328 |

(Continued)

FOREIGN PATENT DOCUMENTS

WO    2014178687 A1    11/2014

OTHER PUBLICATIONS

Dong Meng("Approximate Message Passing for Multi-Carrier Transmission over Doubly Selective Channels", Presented in Partial Fulfilment of the Requirement for the Degree Master of Science in the Graduate School of The Ohio State University, Graduate Program in Department of ECE, The Ohio State University, 2012, pp. 1-53).*

(Continued)

*Primary Examiner* — Helene Tayong

(57) ABSTRACT

A mobile device includes a receiver configured to perform hybrid precoding on signals received through a large bandwidth communication. The receiver includes a plurality of antennas configured to receive wireless communications signals through the large bandwidth communication. The receiver also includes a number of radio frequency (RF) chains, each including a low-bit analog to digital converter (ADC) configured to preform precoding to receive the data and control signals. The receiver further includes a baseband processor configured to perform baseband detection.

20 Claims, 6 Drawing Sheets

(56) References Cited

U.S. PATENT DOCUMENTS

| | | | |
|---|---|---|---|
| 2013/0039445 A1* | 2/2013 | Hwang | H04B 7/0617 375/316 |
| 2013/0093624 A1* | 4/2013 | Raczkowski | H01Q 3/30 342/368 |
| 2014/0050280 A1 | 2/2014 | Stirling-Gallacher et al. | |
| 2014/0064339 A1* | 3/2014 | Kim | H04L 5/0051 375/219 |

OTHER PUBLICATIONS

Alkhateeb, El Ayach, Leus, Heath, Hybrid Precoding for Millimeter Wave Cellular Systems with Partial Channel Knowledge, ITA Workshop Feb. 10-15, 2013, 5 pgs, IEEE, San Diego, CA.

El Ayach, Rajagopol, Abu-Surra, Pi, Heath, Spatially Sparse Precoding in Millimeter Wave MIMO Systems, IEEE Transactions on Wireless Communications,vol. 13, No. 3 Mar. 2014,15 pg.

Bai, Nossek, Energy efficiency maximization for 5G multi-antenna receivers, Special Issue Paper, 2014, 12 pgs. Trans. Emerging Tel. Tech, Pub. Wiley Online Library.

Baykas, Sum, Lan, Wang, Rahman, Harada, The First IEEE Wireless Standard for Data Rates over 1 Gbps;IEEE 802.15.3c, Jul. 2011,8pgs.

Brady, Behdad, Sayeed, Beamspace MIMO for Millimeter-Wave Communications System Architecture, Modeling, Analysis, and Measurements, IEEE vol. 61, No. 7, Jul. 2013, 14 pgs.

Dabeer, Singh, Madhow, On the Limits of Communication Performance with One-bit A-D Conversion, IEEE Workshop (SPAWC 06), Cannes, France, Jul. 2006, 5pgs.

Hur, Kim, Love, Krogmeier, Thomas, Ghosh, Millimeter Wave Beamforming for Wireless Backhaul and Access in Small Cell Networks, IEEE vol. 61, No. 10, Oct. 2013, 13 pgs.

Kim, Kim, Seol, Multi-beam transmission diversity with hybrid beamforming for MIMO-OFDM systems, GC Wkshps 2013 IEEE Dec. 9-13, 2013, Atlanta,GA, 5 pps.

Mezghani, Nossek, Capacity Lower Bound of MIMO Channels with Output Quantization and Correlated Noise,ISIT12, Jul. 1-6, 2012,Cambridge, MA 5pgs.

Mo, Schniter, Prelcic, Heath, Channel Estimation in Millimeter Wave MIMO Systems with One-Bit Quantization, 2014 Asilomar Conf. Nov. 3-6, Pacific Grove CA 5pgs.

Mo, Heath, High SNR capacity of millimeter wave MIMO systems with one-bit quantization, ITA14 Feb. 9-14, San Diego, CA 5pgs.

Mo Heath, Capacity Analysis of One-Bit Quantized MIMO Systems With Transmitter Channel State Information, IEEE vol. 63, No. 20 Oct. 15, 2015, 15 pgs.

Sayeed, Raghavan, Maximizing MIMO Capacity in Sparse Multipath With Reconfigurable Antenna Arrays, IEEE vol. 1, No. 1, Jun. 2007 11 pgs.

Singh, Dabeer, Madhow, On the limits of communication with low-precision analog-to-digital conversion at the receiver, IEEE vol. 57, No. 12 Dec. 2009, 11 pgs.

Tsang, Poon, Addepalli, Coding the Beams Improving Beamforming Training in mmWave Communication System,Globecom 2011,Dec. 2-9, 2011 Houston,TX,6pgs.

Wang et al. Beam codebook based beamforming protocol for multi-Gbps millimeter-wave WPAN systems, IEEE vol. 27, No. 8, Oct. 2009, 10 pgs.

* cited by examiner

HYBRID PRECODING DESIGN FOR MULTIPLE INPUT MULTIPLE OUTPUT SYSTEM WITH FEW-BIT ANALOG TO DIGITAL CONVERTERS

CROSS-REFERENCE TO RELATED APPLICATION(S) AND CLAIM OF PRIORITY

This application claims priority under 35 U.S.C. § 119(e) to U.S. Provisional Patent Application No. 62/191,742 entitled "HYBRID PRECODING DESIGN FOR MIMO SYSTEM WITH FEW-BIT ADCS" filed on Jul. 13, 2015 and to U.S. Provisional Patent Application No. 62/205,856 entitled "CHANNEL ESTIMATION ALGORITHM AND HYBRID PRECODING DESIGN FOR MIMO SYSTEM WITH FEW-BIT ADCS" filed on Aug. 17, 2015. The above-identified provisional patent applications are hereby incorporated by reference in their entirety.

TECHNICAL FIELD

This disclosure relates generally to wireless communication precoding. More specifically, this disclosure relates to hybrid precoding for multiple input multiple output system with few-bit Analog to digital converters.

BACKGROUND

The large available bandwidth in the millimeter wave (mmWave) band makes it promising for wireless communication, for both local area networks and cellular systems. To achieve sufficient received link margin, however, beamforming with large antenna arrays need to be deployed at both the transmitter and receiver. Unfortunately, the high power consumption of mixed-signal components on which the traditional precoding solutions rely mainly on makes the precoding/combining processing in the baseband, unfeasible.

SUMMARY

This disclosure provides a system and method for hybrid precoding for Multiple input multiple output system with few-bit Analog to digital converters.

In a first embodiment, a mobile device is provided. The mobile device includes a plurality of antennas configured to transmit and receive wireless communications signals. The mobile device also includes a transceiver configured to communicate, via the plurality of antennas, data and control signals over a large bandwidth communication. The transceiver includes a low-bit analog to digital converter (ADC) configured to preform hybrid precoding to receive the data and control signals. The mobile device further includes processing circuitry configured to control the transceiver to transmit and receive the data and control signals.

In a second embodiment, a receiver is provided. The receiver includes a plurality of antennas configured to receive wireless communications signals via a large bandwidth communication. The receiver also includes a number of radio frequency (RF) chains, each comprising a low-bit analog to digital converter (ADC) configured to preform precoding to receive the data and control signals. The receiver further includes a baseband processor configured to perform baseband detection.

In a third embodiment, a method is provided. The method includes receiving wireless communications signals via a large bandwidth communication. The method also includes precoding, by a low-bit analog to digital converter, the received signals. The method further includes performing baseband detection, by a baseband processor, on the precoded signals.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
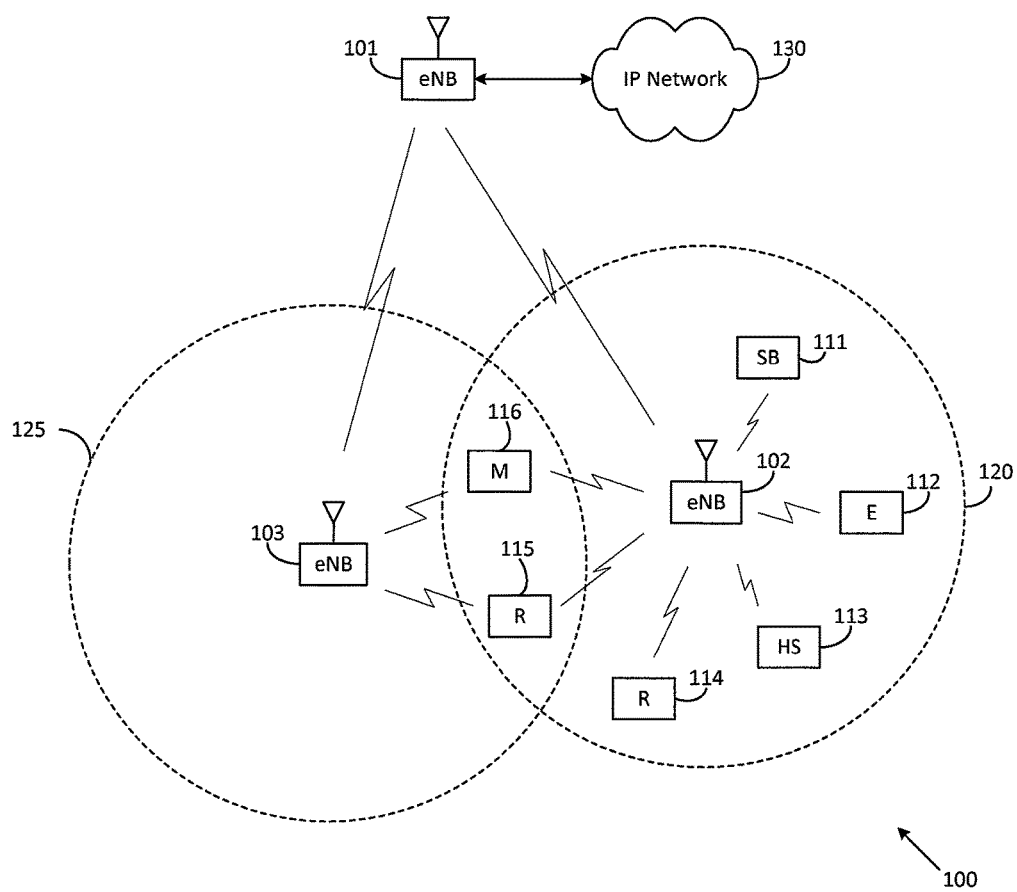
FIG. 1 illustrates an example wireless network according to this disclosure.

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system. Although examples of the present disclosure may be directed towards millimeter waver (mmWave) communications, the embodiments of the present disclosure apply equally to any large bandwidth communication.

The following documents and standards descriptions are hereby incorporated by reference into the present disclosure as if fully set forth herein: J. Wang, Z. Lan, C. Pyo, T. Baykas, C. Sum, M. Rahman, J. Gao, R. Funada, F. Kojima, H. Harada et al., "Beam codebook based beamforming protocol for multi-Gbps millimeter-wave WPAN systems," vol. 27, no. 8, pp. 1390-1399, November 2009 (REF1); S. Hur, T. Kim, D. Love, J. Krogmeier, T. Thomas, and A. Ghosh, "Millimeter wave beamforming for wireless backhaul and access in small cell networks," vol. 61, no. 10, pp. 4391-4403, October 2013 (REF2); Y. Tsang, A. Poon, and S. Addepalli, "Coding the beams: Improving beamforming training in mmwave communication system," Houston, Tex., December 2011, pp. 1-6 (REF3); A. Sayeed and V. Raghavan, "Maximizing MIMO capacity in sparse multipath with reconfigurable antenna arrays," *IEEE Journal of Selected Topics in Signal Processing*, vol. 1, no. 1, pp. 156-166, June 2007 (REF4); J. Brady, N. Behdad, and A. Sayeed, "Beamspace MIMO for millimeter-wave communications: System architecture, modeling, analysis, and measurements," *IEEE Trans. on Ant. and Propag.*, vol. 61, no. 7, pp. 3814-3827, July 2013 (REF5); "IEEE 802.11ad standard draft D0.1." [Online]. Available at: www.ieee802.org/11/Reports/tgad update.htm (REF6); T. Baykas, C.-S. Sum, Z. Lan, J. Wang, M. Rahman, H. Harada, and S. Kato, "IEEE 802.15.3c: the first IEEE wireless standard for data rates over 1 Gb/s," vol. 49, no. 7, pp. 114-121, July 2011 (REFI); O. El Ayach, S. Rajagopal, S. Abu-Surra, Z. Pi, and R. Heath, "Spatially sparse precoding in millimeter wave MIMO systems," vol. 13, no. 3, pp. 1499-1513, March 2014 (REF5); C. Kim, T. Kim, and J.-Y. Seol, "Multi-beam transmission diversity with hybrid beamforming for MIMO-OFDM systems," in *Proc. of IEEE Globecom Workshops (GC Wkshps)*, Atlanta, Ga., December 2013, pp. 61-65 (REF9); A. Alkhateeb, O. El Ayach, G. Leus, and R. Heath, "Hybrid precoding for millimeter wave cellular systems with partial channel knowledge," in *Proc. of Info. Th. and App. Workshop*, February 2013, pp. 1-5 (REF10); J. Singh, O. Dabeer, and U. Madhow, "On the limits of communication with low-precision analog-to-digital conversion at the receiver," *IEEE Trans. Commun.*, vol. 57, no. 12, pp. 3629-3639, 2009 (REF11); A. Mezghani and J. Nossek, "Capacity lower bound of MIMO channels with output quantization and correlated noise," in *IEEE International Symposium on Information Theory Proceedings (ISIT)*, 2012 (REF12); J. Mo and R. W. Heath Jr, "Capacity Analysis of One-Bit Quantized MIMO Systems with Transmitter Channel State Information," *IEEE Transactions on Signal Processings*, vol. 63, no 20, pp. 5498-5512, October 2015 (REF13); J. Mo, P. Schniter, N. G. Prelcic, and R. W. Heath Jr, "Channel estimation in millimeter wave MIMO systems with one-bit quantization," *Proc. Asilomar Conf on Signals, Systems and Computers*, 2014 (REF14); J. Mo and R. W. Heath Jr., "High SNR capacity of millimeter wave MIMO systems with one-bit quantization," in *Proc. of Information Theory and Applications (ITA) Workshop*, 2014 (REF15); Q. Bai and J. Nossek, "Energy efficiency maximization for 5G multi-antenna receivers," *Transactions on Emerging Telecommunications Technologies*, 2015 (REF16); and O. Dabeer, J. Singh, and U. Madhow, "On the limits of communication performance with one-bit analog-to-digital conversion," in *IEEE 7th Workshop on Signal Processing Advances in Wireless Communications*, 2006, pp. 1-5 (REF17).

To overcome the high power consumption issues that make precoding/combining processing in the baseband, infeasible, embodiments of the present disclosure provide new receiver architectures that relax the requirement of associating a high-resolution digital to analog converter (DAC)/analog-to-digital converter (ADC) per antenna. To overcome the limitation on the number of RF chain, one option is to perform all the needed processing in the RF domain. This analog-only beamforming depends on controlling the phase of the signal transmitted at each antenna via a network of phase shifters. Adaptive beamforming algorithms and multi-resolution codebooks were developed by which the transmitter and receiver jointly design their analog beamforming vectors. Unique signatures are assigned to the different training beamforming vectors and used to minimize the training overhead. Beamspace multi-input multi-output (MIMO) has been introduced in which Discrete Fourier Transform (DFT) beamforming vectors are used to direct the transmitted signals towards the subspaces that asymptotically maximize the received signal power with large numbers of antennas. Analog beamformers are subject to additional constraints, for example, the phase shifters might be digitally controlled and have only quantized phase values and adaptive gain control might not be implemented. To support multi-stream multiplexing, hybrid precoding, that divides precoding processing between analog and digital domains is proposed for mmWave systems.

To support multi-stream multiplexing, hybrid precoding, that divides precoding processing between analog and digital domains, has been proposed for mmWave systems. For example, the sparse nature of the mmWave channels has been exploited to develop low-complexity hybrid precoding algorithms using the algorithmic concept of basis pursuit assuming the availability of channel knowledge. In addition, low-complexity hybrid beamforming algorithms were proposed for single-user single-stream MIMO-OFDM systems with the objective of maximizing either the received signal strength or the sum-rate over different sub-carriers. Also, a hybrid precoding algorithm that requires only partial knowledge about the mmWave channels has been devised. Hybrid precoding, though, in these examples still assumes that the RF chains includes high-resolution ADCs, which consumes high power.

Another challenge in large bandwidth communications, such as the mmWave band communication, is the power consumption associated with the high-speed high resolution ADCs. An alternative to high resolution ADCs is to accept ultralow resolution ADCs (1-3 bits), which reduces power consumption and cost. In REF11-REF16, a receiver architecture where the received signal at each antenna is quantized by few-bit ADC directly without any analog combining is considered. In that architecture, the number of RF chains is same as that of receiver antennas, which means the hardware cost is still high.

Certain embodiments of the present disclosure combine hybrid precoding with 1-bit ADCs. First, a lower bound is developed on the achievable rate with the proposed transceiver architecture assuming channel inversion based digital precoding. Then, an upper bound is derived on system capacity, and shows that a relatively small gap exists between the lower and upper bounds. Further, according to certain embodiments, the proposed architecture can achieve a performance comparable to that achieved with fully-digital precoding in the low-to-medium SNR range, which is of a special importance for mmWave communications.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of eNBs 101-103 is configured to perform hybrid precoding for Multiple input multiple output system with few-bit Analog to digital converters. In addition, one or more of UEs 111-116 is configured to perform hybrid precoding for Multiple input multiple output system with few-bit Analog to digital converters. That is, receivers contained in respective ones of the eNBs 101-103 and UEs 111-116 are configured to perform precoding on large bandwidths utilizing a low-bit ADC. A low-bit ADC includes 1-3 bits while a normal ADC includes at least eight (8) bits.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
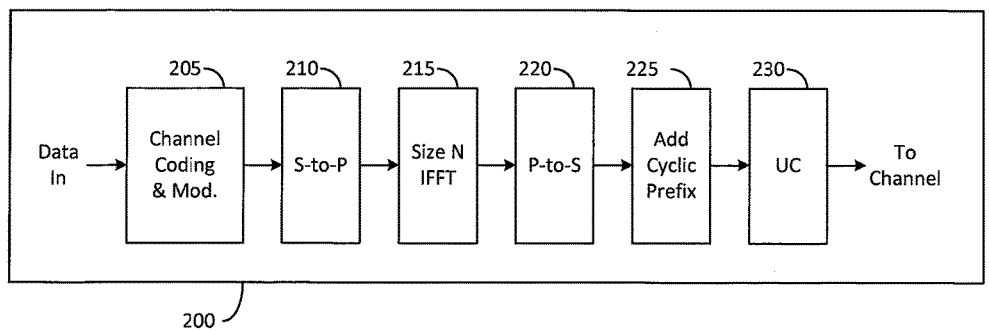
FIGS. 2A and 2B illustrate example wireless transmit and receive paths according to this disclosure.
Figure 2B:
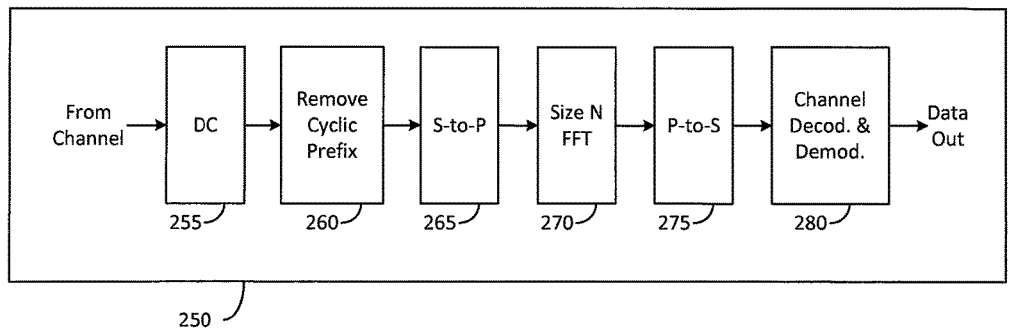

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to perform hybrid precoding for Multiple input multiple output system with few-bit Analog to digital converters. That is, the receive path 250 are configured to perform precoding on large bandwidths utilizing a low-bit ADC.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
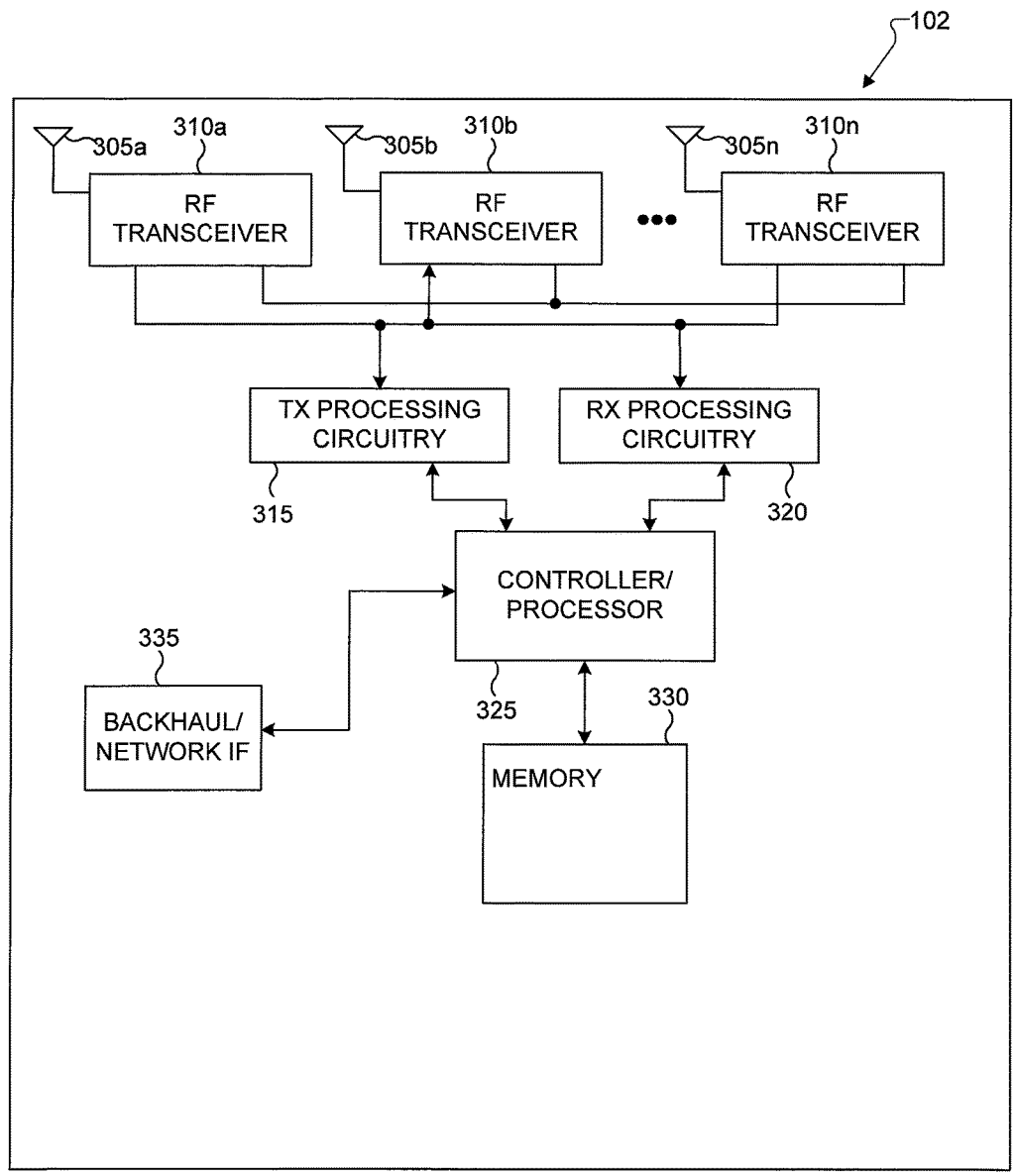
FIG. 3 illustrates an example enhanced Node B according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335. In certain embodiments, the multiple antennas 305a-305n is configured as a small array having a maximum of eight antennas. In certain embodiments, the multiple antennas 305a-305n is configured as a large array having from several tens to over several hundred antennas.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support perform hybrid precoding for Multiple input multiple output system with few-bit Analog to digital converters. That is, the controller/processor 325 can control the RX processing circuitry 320 to perform precoding on large bandwidths utilizing a low-bit ADC. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support communication with aggregation of FDD cells and TDD cells.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

Figure 4:
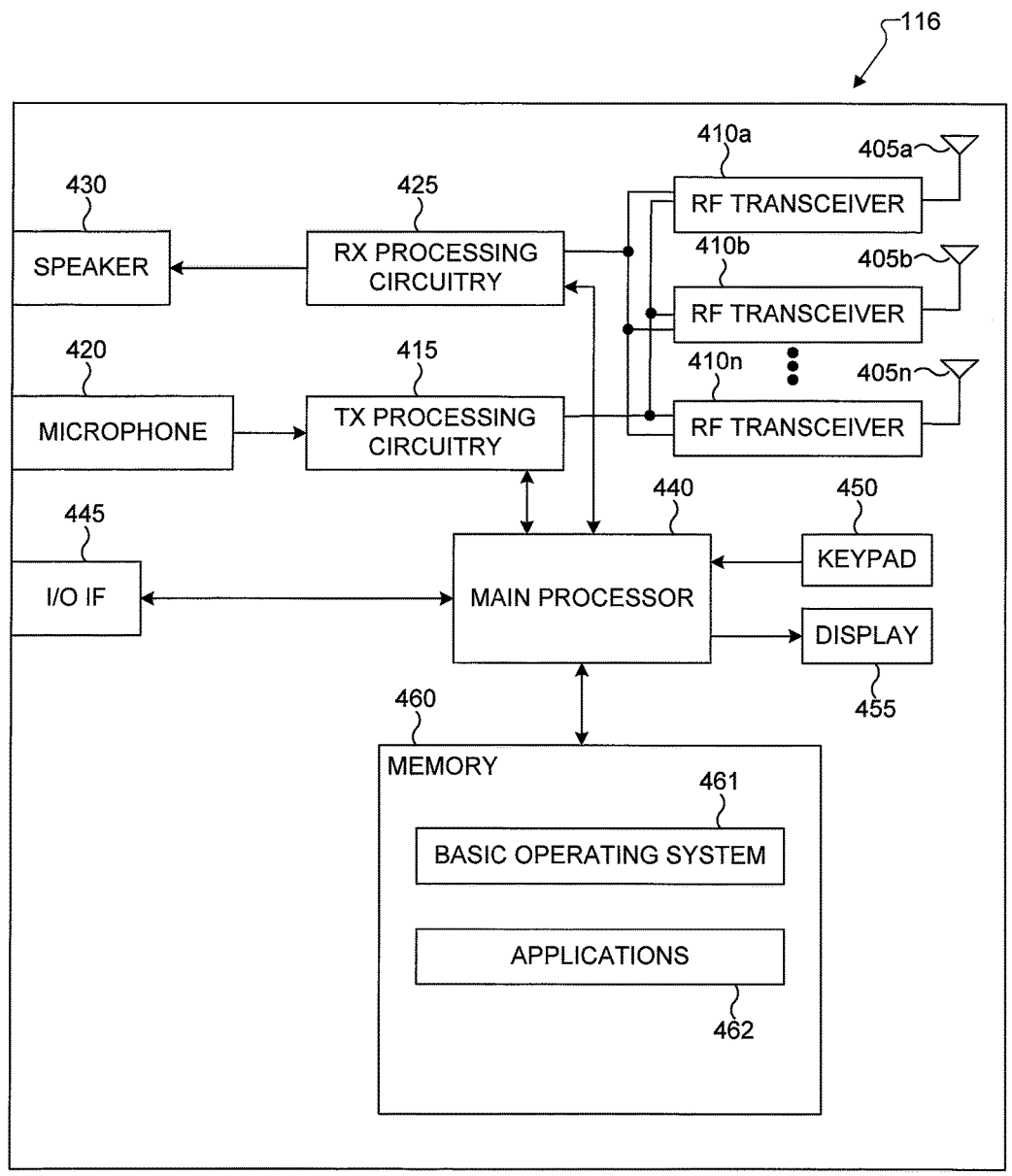
FIG. 4 illustrates an example User Equipment according to this disclosure.

FIG. 4 illustrates an example UE 116 according to this disclosure. The embodiment of the UE 116 illustrated in FIG. 4 is for illustration only, and the UEs 111-115 of FIG. 1 could have the same or similar configuration. However, UEs come in a wide variety of configurations, and FIG. 4 does not limit the scope of this disclosure to any particular implementation of a UE.

The UE 116 includes multiple antennas 405a-405n, radio frequency (RF) transceivers 410a-410n, transmit (TX) processing circuitry 415, a microphone 420, and receive (RX) processing circuitry 425. The TX processing circuitry 415 and RX processing circuitry 425 are respectively coupled to each of the RF transceivers 410a-410n, for example, coupled to RF transceiver 410a, RF transceiver 410b through to a $N^{th}$ RF transceiver 410n, which are coupled respectively to antenna 405a, antenna 405b and an $N^{th}$ antenna 405n. In certain embodiments, the UE 116 includes a single antenna 405a and a single RF transceiver 410a. In certain embodiments, the multiple antennas 405a-405n is configured as a small array having a maximum of eight antennas. In certain embodiments, the multiple antennas 405a-405n is configured as a large array having from several tens to over several hundred antennas. The UE 116 also includes a speaker 430, a main processor 440, an input/output (I/O) interface (IF) 445, a keypad 450, a display 455, and a memory 460. The memory 460 includes a basic operating system (OS) program 461 and one or more applications 462.

The RF transceivers 410a-410n receive, from respective antennas 405a-405n, an incoming RF signal transmitted by an eNB or AP of the network 100. In certain embodiments, each of the RF transceivers 410a-410n and respective antennas 405a-405n is configured for a particular frequency band or technological type. For example, a first RF transceiver 410a and antenna 405a can be configured to communicate via a near-field communication, such as BLUETOOTH®, while a second RF transceiver 410b and antenna 405b can be configured to communicate via a IEEE 802.11 communication, such as Wi-Fi, and another RF transceiver 410n and antenna 405n can be configured to communicate via cellular communication, such as 3G, 4G, 5G, LTE, LTE-A, or WiMAX. In certain embodiments, one or more of the RF transceivers 410a-410n and respective antennas 405a-405n is configured for a particular frequency band or same technological type. The RF transceivers 410a-410n down-converts the incoming RF signal to generate an intermediate frequency (IF) or baseband signal. The IF or baseband signal is sent to the RX processing circuitry 425, which generates a processed baseband signal by filtering, decoding, and/or digitizing the baseband or IF signal. The RX processing circuitry 425 transmits the processed baseband signal to the speaker 430 (such as for voice data) or to the main processor 440 for further processing (such as for web browsing data).

The TX processing circuitry 415 receives analog or digital voice data from the microphone 420 or other outgoing baseband data (such as web data, e-mail, or interactive video game data) from the main processor 440. The TX processing circuitry 415 encodes, multiplexes, and/or digitizes the outgoing baseband data to generate a processed baseband or IF signal. The RF transceivers 410a-410n receive the outgoing processed baseband or IF signal from the TX processing circuitry 415 and up-converts the baseband or IF signal to an RF signal that is transmitted via one or more of the antennas 405a-405n.

The main processor 440 can include one or more processors or other processing devices and execute the basic OS program 461 stored in the memory 460 in order to control the overall operation of the UE 116. For example, the main processor 440 could control the reception of forward channel signals and the transmission of reverse channel signals by the RF transceivers 410a-410n, the RX processing circuitry 425, and the TX processing circuitry 415 in accordance with well-known principles. In some embodiments, the main processor 440 includes at least one microprocessor or microcontroller.

The main processor 440 is also capable of executing other processes and programs resident in the memory 460, such as operations for perform hybrid precoding for Multiple input multiple output system with few-bit Analog to digital converters. That is, the main processor 440 can control the RX processing circuitry 425 or the RF transceivers 410a-410n receive path 250 to perform precoding on large bandwidths utilizing a low-bit ADC. The main processor 440 can move data into or out of the memory 460 as required by an executing process. In some embodiments, the main processor 440 is configured to execute the applications 462 based on the OS program 461 or in response to signals received from eNBs or an operator. The main processor 440 is also coupled to the I/O interface 445, which provides the UE 116 with the ability to connect to other devices such as laptop computers and handheld computers. The I/O interface 445 is the communication path between these accessories and the main controller 440.

The main processor 440 is also coupled to the keypad 450 and the display unit 455. The user of the UE 116 can use the keypad 450 to enter data into the UE 116. The display 455 can be a liquid crystal display or other display capable of rendering text or at least limited graphics, such as from web sites, or a combination thereof.

The memory 460 is coupled to the main processor 440. Part of the memory 460 could include a random access memory (RAM), and another part of the memory 460 could include a Flash memory or other read-only memory (ROM).

Although FIG. 4 illustrates one example of UE 116, various changes may be made to FIG. 4. For example, various components in FIG. 4 could be combined, further subdivided, or omitted and additional components could be added according to particular needs. As a particular example, the main processor 440 could be divided into multiple processors, such as one or more central processing units (CPUs) and one or more graphics processing units (GPUs). Also, while FIG. 4 illustrates the UE 116 configured as a mobile telephone or smartphone, UEs could be configured to operate as other types of mobile or stationary devices.

Figure 5:
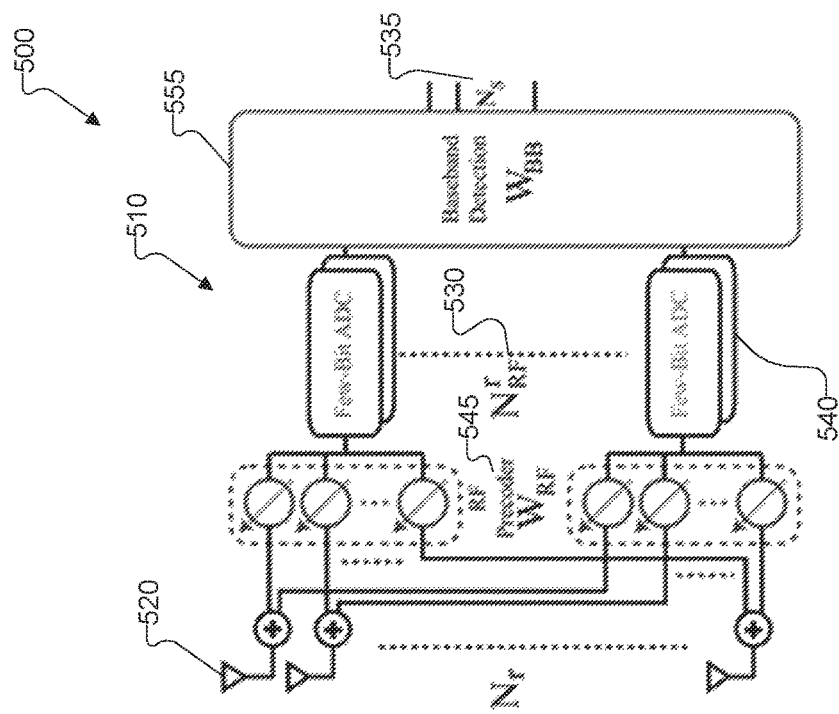
FIG. 5 illustrates MIMO channel with hybrid precoding and few-bit ADCs according to this disclosure.
Figure 5:
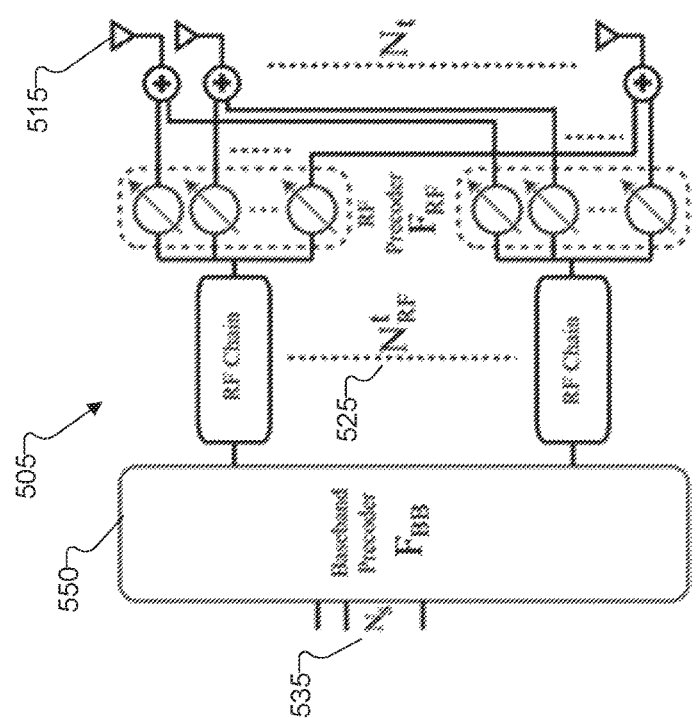

FIG. 5 illustrates MIMO channel with hybrid precoding and few-bit ADCs according to this disclosure. The embodiment of the MIMO channel 500 shown in FIG. 5 is for illustration only. Other embodiments could be used without departing from the scope of the present disclosure.

The MIMO channel 500 includes a transmitter 505 and a receiver 510. In certain embodiments, the transmitter 505 is included in eNB 102, such as being comprised of multiple antennas 305a-305n, multiple RF transceivers 310a-310n and transmit (TX) processing circuitry 315; and the receiver 510 is included in UE 116, such as being comprised of multiple antennas 405a-405n, radio frequency (RF) transceivers 410a-410n, and RX processing circuitry 425. In certain embodiments, the transmitter 505 is included in UE 116, such as being comprised of multiple antennas 405a-405n, radio frequency (RF) transceivers 410a-410n, and transmit (TX) processing circuitry 415; and the receiver 510 is included in eNB 102, such as being comprised of multiple antennas 305a-305n, multiple RF transceivers 310a-310n, and receive (RX) processing circuitry 320.

The transmitter 505 is equipped with $N_T$ antennas 515. For example, the $N_T$ antennas 515 are the multiple antennas 305a-305n when the transmitter 505 is eNB 102. Alternatively, the $N_T$ antennas 515 are the multiple antennas 405a-405n when the transmitter 505 is UE 116. Additionally, the receiver 510 is equipped with $N_R$ antennas 520. For example, the $N_R$ antennas 520 are the multiple antennas 305a-305n when the receiver 510 is eNB 102. Alternatively, the $N_R$ antennas 520 are the multiple antennas 405a-405n when the receiver 510 is UE 116. The number of RF chains is $N^t_{RF}$ 525 at the transmitter 505 and $N^r_{RF}$ 530 at the receiver 510. The RF chains, $N^r_{RF}$ 530, include Few-Bit ADCs 540. The Few-Bit ADCs 540 can be configured to have 1, 2 or 3 bits. The number of data streams is denoted as $N_s$ 535.

Since analog precoding is implemented by analog phase shifters in the transmitter 505 and in the receiver 510, each element of $F_{RF}$ 540 and $W_{RF}$ 545 has unit-norm. For the digital precoding $F_{BB}$ 550 at the transmitter 510 and $W_{BB}$ 555 at the receiver 505, there is no such constraint.

The receiver signal is as follows:

$$v = W^*_{BB} \text{sgn}(W^*_{RF} H F_{RF} F_{BB} s + W^*_{RF} n) \qquad (1),$$

where s is the baseband signal and sgn is the signum function.

The optimization problem is formulated to maximize the mutual information between s and v as follows, $$\max_{F_{BB} F_{RF} W_{RF} W_{BB}} I(s; v) \qquad (2)$$

$$\text{s.t. } F_{RF} \in \mathcal{F}_{RF} \qquad (3)$$

$$W_{RF} \in \mathcal{W}_{RF} \qquad (4)$$

$$\|F_{RF} F_{BB}\|_F^2 \le N_s \qquad (5)$$

where $\mathcal{F}_{RF}$ and $\mathcal{W}_{RF}$ are the sets of feasible RF precoders and combiners, respectively.

Proposed algorithm of Channel Estimation:

According to the virtual channel model, Equation 6 is obtained as:

$$H_k = F_{N_r} G_k F^*_{N_t} \qquad (6)$$

where $F_{N_r}$ and $F^*_{N_t}$ are discrete Fourier Transform matrices and G is the channel in the angular domain which has sparse property. Then the channel estimation problem is formulated as a noisy quantized compressed sensing problem.

Embodiments of the present disclosure use an algorithm called Generalized Approximate Message Passing (GAMP), which decomposes the vector-valued estimation problem into a sequence of scalar problems. GAMP is applicable to estimation problems with linear transform and component-wise nonlinearities. In addition, GAMP converges very fast, such as in less than twenty-five steps in most cases.

Proposed Algorithm of Precoding Design

The analog precoding is selected from the DFT matrix. For digital precoding, channel inversion precoding is used.

The algorithm is summarized in Algorithm 1 (hybrid precoding design) as follows:

1) Analog precoding Design:
 a) Choose $W_{RF}$ from DFT matrix $D_{N_r}$ and choose $F_{RF}$ from DFT matrix $D_{N_t}$, where $D_m$ denotes the DFT matrix with dimension m×m.
 b) Compute the effective channel $$\hat{H} = W^*_{RF} H F_{RF} \qquad (7)$$

c) Calculate the harmonic mean of the first $N_s$ squared singular values of the effective channel $\hat{H}$.
 d) Repeat steps a)-c) to find the pair $(\overline{W}_{RF}, \overline{F}_{RF})$ maximizing the harmonic mean.

2) Digital precoding design:
Compute the optimal effective channel:

$$\overline{H} \triangleq \overline{W}^*_{RF} H \overline{F}_{RF} \qquad (8)$$

Set the digital precoding matrix $F_{BB}$ as:

$$F_{BB} = \sqrt{\frac{N_s}{N_t \text{tr}\{(\overline{H}\,\overline{H}^*)^{-1}\}}} \overline{H}^* (\overline{H}\,\overline{H}^*)^{-1}, \qquad (9)$$

and the digital combining matrix $W_{BB}$ as:

$$W_{BB} = I.$$

The algorithm is summarized in Algorithm 2 (Hybrid precoding design—Maximum Ratio Transmission) as follows:

1) Analog precoding design:
 a) Choose $W_{RF}$ from DFT matrix $D_{N_r}$ and choose $F_{RF}$ from DFT matrix $D_{N_t}$, where $D_m$ denotes the DFT matrix with dimension m×m.

b) Compute the effective channel $$\tilde{H} = W^*_{RF} H F_{RF} \quad (10)$$

c) Calculate η of the $\tilde{H}$ $$\eta = \frac{\tilde{\sigma}_1^4 + \tilde{\sigma}_2^4 + \ldots + \tilde{\sigma}_{N_s}^4}{\tilde{\sigma}_1^2 + \tilde{\sigma}_2^2 + \ldots + \tilde{\sigma}_{N_s}^2}, \quad (11)$$

where $\tilde{\sigma}_i$ are the singular value of $\tilde{H}$.
d) Repeat steps a)-c) to find the optimal pair ($\overline{W}_{RF}$, $\overline{F}_{RF}$) maximizing the term η.
2) Digital precoding design:
Compute the optimal effective channel:

$$\overline{H} \triangleq \overline{W}^*_{RF} H \overline{F}_{RF}$$

Set the digital precoding matrix $F_{BB}$ as:

$$F_{BB} = \sqrt{\frac{N_s}{N_t tr(\overline{H}\,\overline{H}^*)}}\,\overline{H}^*, \quad (12)$$

and the digital combining matrix $W_{BB}$ as:

$W_{BB} = I$.

Figure 6:
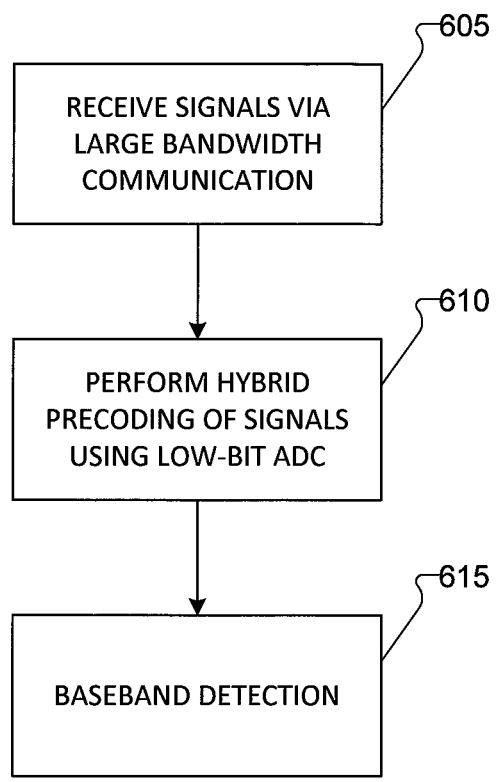
FIG. 6 illustrates a process for channel estimation and hybrid precoding according to this disclosure.

FIG. 6 illustrates a process for channel estimation and hybrid precoding according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a receiver chain in, for example, a mobile station or a base station.

In block 605, wireless communications signals are received via a large bandwidth communication. In block 610, the receiver performs hybrid precoding on the received signals using a low-bit ADC. Thereafter, baseband detection of the precoded signals is performed in block 615.

Large antenna arrays will likely be a key component of millimeter wave (mmWave) systems to guarantee sufficient received power. The high power consumption of mixed-signal components, however, makes fully-digital precoding/combining solutions infeasible. To overcome this challenge, hybrid analog/digital precoding that requires less number of RF chains compared with the number of antennas, and combining with low-resolution analog-to-digital converters (ADCs) were proposed. Embodiments of the present disclosure provide mmWave Massive MIMO systems that combine both hybrid precoding and 1-bit ADC combining. The transceiver architecture in certain embodiments achieves a comparable gain to fully-digital solution in the low-to-medium SNR range, which is especially important for mmWave systems, while requiring significantly less power consumption.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile device comprising:
a plurality of antennas configured to transmit and receive wireless communications signals;
a transceiver configured to communicate, via the plurality of antennas, data and control signals over a large bandwidth communication, wherein the transceiver includes a low-bit analog to digital converter (ADC) configured to perform hybrid precoding to receive the data and control signals; and
processing circuitry configured to:
perform, by a first transceiver circuit, digital precoding as a function of an ADC bit precision used by a second transceiver circuit, and
perform analog precoding by choosing from columns of a discrete Fourier transform (DFT) matrix,
wherein the choice of columns is dependent on the digital precoding and ADC bit precision.

2. The mobile device of claim 1, wherein the low-bit ADC comprises a single bit ADC.

3. The mobile device of claim 1, wherein the processing circuitry utilizes a Generalized Approximate Message Passing (GAMP) algorithm to process a received channel estimation training signal and estimate a channel.

4. The mobile device of claim 1, wherein:
the digital precoding is performed by one of channel inversion or maximum ratio transmission; and
the processing circuitry is configured to choose from the columns of the DFT matrix based on a metric that depends on the digital precoding.

5. The mobile device of claim 4, wherein the second transceiver circuit is configured to feedback its ADC bit precision to the first transceiver circuit.

6. The mobile device of claim 4, wherein, when the digital precoding is performed by channel inversion, the processing circuitry is configured to choose from the columns of the DFT matrix based on increasing or maximizing a harmonic mean of squared singular values of an effective channel.

7. The mobile device of claim 4, wherein, when the digital precoding is performed by maximum ratio transmission, the processing circuitry is configured to choose from the columns of the DFT matrix based on increasing or maximizing:

$$\eta = \frac{\tilde{\sigma}_1^4 + \tilde{\sigma}_2^4 + \ldots + \tilde{\sigma}_{N_s}^4}{\tilde{\sigma}_1^2 + \tilde{\sigma}_2^2 + \ldots + \tilde{\sigma}_{N_s}^2},$$

where $\tilde{\sigma}_i$ is a singular value of an effective channel and $N_s$ is a number of squared singular values of the effective channel.

8. A transceiver comprising:
a plurality of antennas configured to receive wireless communications signals via a large bandwidth communication;

a number of radio frequency (RF) chains, each comprising a low-bit analog to digital converter (ADC) configured to perform hybrid precoding to receive data and control signals; and a baseband processor configured to:
  perform baseband detection,
  perform, by a first transceiver circuit, digital precoding as a function of an ADC bit precision used by a second transceiver circuit, and
  perform analog precoding by choosing from columns of a discrete Fourier transform (DFT) matrix,
  wherein the choice of columns is dependent on the digital precoding and ADC bit precision.

9. The transceiver of claim 8, wherein each low-bit ADC comprises a single bit ADC.

10. The transceiver of claim 8, wherein the baseband processor utilizes a Generalized Approximate Message Passing (GAMP) algorithm to process a received channel estimation training signal and estimate a channel.

11. The transceiver of claim 8, wherein:
  the digital precoding is performed by one of channel inversion or maximum ratio transmission; and
  the baseband processor is configured to choose from the columns of the DFT matrix based on a metric that depends on the digital precoding.

12. The transceiver of claim 11, wherein the second transceiver circuit is configured to feedback its ADC bit precision to the first transceiver circuit.

13. The transceiver of claim 11, wherein, when the digital precoding is performed by channel inversion, the baseband processor is configured to choose from the columns of the DFT matrix based on increasing or maximizing a harmonic mean of squared singular values of an effective channel.

14. The transceiver of claim 11, wherein, when the digital precoding is performed by maximum ratio transmission, the baseband processor is configured to choose from the columns of the DFT matrix based on increasing or maximizing:

$$\eta = \frac{\tilde{\sigma}_1^4 + \tilde{\sigma}_2^4 + \ldots + \tilde{\sigma}_{N_s}^4}{\tilde{\sigma}_1^2 + \tilde{\sigma}_2^2 + \ldots + \tilde{\sigma}_{N_s}^2},$$

where $\tilde{\sigma}_i$ is a singular value of an effective channel and $N_s$ is a number of squared singular values of the effective channel.

15. A method comprising:
  receiving wireless communications signals via a large bandwidth communication;
  precoding, by a low-bit analog to digital converter (ADC), the received signals;
  performing baseband detection, by a baseband processor, on the precoded signals;
  performing, by a first transceiver circuit, digital precoding as a function of an ADC bit precision used by a second transceiver circuit; and
  performing analog precoding by choosing from columns of a discrete Fourier transform (DFT) matrix,
  wherein the choice of columns is dependent on the digital precoding and ADC bit precision.

16. The method of claim 15, wherein each low-bit ADC comprises a single bit ADC.

17. The method of claim 15, wherein performing baseband detection comprises utilizing a Generalized Approximate Message Passing (GAMP) algorithm to process a received channel estimation training signal and estimate a channel.

18. The method of claim 15, wherein:
  the digital precoding is performed by one of channel inversion or maximum ratio transmission as a function of an ADC bit precision used by a second transceiver circuit,
  the choosing from the columns of the DFT matrix is based on a metric that depends on the digital precoding, and
  the second transceiver circuit is configured to feedback its ADC bit precision to the first transceiver circuit.

19. The method of claim 18, wherein, when the digital precoding is performed by channel inversion, the baseband processor is configured to choose from the columns of the DFT matrix based on increasing or maximizing a harmonic mean of squared singular values of an effective channel.

20. The method of claim 18, wherein, when the digital precoding is performed by maximum ratio transmission, the baseband processor is configured to choose from the columns of the DFT matrix based on increasing or maximizing:

$$\eta = \frac{\tilde{\sigma}_1^4 + \tilde{\sigma}_2^4 + \ldots + \tilde{\sigma}_{N_s}^4}{\tilde{\sigma}_1^2 + \tilde{\sigma}_2^2 + \ldots + \tilde{\sigma}_{N_s}^2},$$

where $\tilde{\sigma}_i$ is a singular value of an effective channel and $N_s$ is a number of squared singular values of the effective channel.

* * * * *